United States Patent [19]
Correia

[11] Patent Number: 6,135,715
[45] Date of Patent: Oct. 24, 2000

[54] TIP INSULATED AIRFOIL

[75] Inventor: Victor H. S. Correia, Milton Mills, N.H.

[73] Assignee: General Electric Company, Cincinnati, Ohio

[21] Appl. No.: 09/363,727

[22] Filed: Jul. 29, 1999

[51] Int. Cl.[7] .................................................. F01D 5/18
[52] U.S. Cl. ................... 416/97 R; 415/115; 415/173.1; 415/175; 416/92; 416/231 R
[58] Field of Search ...................... 415/115, 116, 415/173.1, 173.4, 175, 176, 178; 416/96 A, 96 R, 97 R, 90 R, 92, 95, 224, 231 R, 241 B

[56] References Cited

U.S. PATENT DOCUMENTS

| | | | |
|---|---|---|---|
| 4,295,785 | 10/1981 | Lardellier | 415/174 |
| 4,487,550 | 12/1984 | Horvath et al. | 416/92 |
| 4,519,745 | 5/1985 | Rosman et al. | 416/96 A |
| 5,752,802 | 5/1998 | Jones | 415/170.1 |

FOREIGN PATENT DOCUMENTS 651787  4/1951  United Kingdom ..................... 416/92

*Primary Examiner*—Edward K. Look
*Assistant Examiner*—Liam McDowell
*Attorney, Agent, or Firm*—Andrew C. Hess; Rodney M. Young

[57] ABSTRACT

A turbine airfoil includes a squealer rib extending outwardly from a tip cap to define a tip cavity thereatop. A thermal insulator is disposed in the tip cavity atop the tip cap.

23 Claims, 2 Drawing Sheets

TIP INSULATED AIRFOIL

The U.S. Government may have certain rights in this invention in accordance with Contract No. N00019-96-C-0080 awarded by the Department of the Navy.

BACKGROUND OF THE INVENTION

The present invention relates generally to gas turbine engines, and, more specifically, to turbine blade cooling.

In a gas turbine engine, air is pressurized in a compressor and mixed with fuel and ignited in a combustor for generating hot combustion gases. The gases flow through turbine stages which extract energy therefrom for powering the compressor and producing useful work such as powering a fan in an aircraft turbofan gas turbine engine.

Each turbine stage includes a stator nozzle having vanes which direct the combustion gases against a corresponding row of turbine blades extending radially outwardly from a supporting rotor disk. The vanes and blades include airfoils having generally concave pressure sidewalls and generally convex suction sidewalls extending axially between leading and trailing edges over which the combustion gases flow during operation.

The turbine blades are mounted to the rotor disk with corresponding dovetails which engage complementary dovetail slots formed in the perimeter of the disk. Each blade includes an inboard platform defining the radially inner boundary of the combustion gas flowpath, with the airfoil extending from a root thereat to a radially outboard tip. The blade tips are spaced closely adjacent to a surrounding stationary shroud for reducing leakage of the combustion gases in the gap therebetween during operation.

However, due to differential expansion and contraction between the blades and surrounding shroud during operation, the blade tips are subject to occasional tip rubs with the shroud.

In order to protect the blade tips, they are typically configured in the form of a squealer rib extension of the pressure and suction sidewalls which extends radially outwardly from a tip cap or floor that closes the radially outer end of the airfoil. The airfoil is hollow below the tip cap and includes various cooling channels or circuits therein for channeling air bled from the compressor for use as a coolant against the heating effect of the hot combustion gases.

In this configuration, the squealer ribs provide short extensions of the airfoil sidewalls for maintaining the aerodynamic profile thereof and provide minimum contact area with the shroud during tip rubs therewith. The underlying tip cap is therefore spaced further away from the shroud and is protected during tip rubs for maintaining the integrity of the airfoil, including the cooling channels therein.

During operation, the squealer ribs are directly subject to the hot combustion gases which flow thereover through the gap with the turbine shroud. They are therefore subject to heating on their three exposed sides, and are correspondingly difficult to cool. High temperature operation of the squealer ribs adversely affects the useful life thereof. The squealer ribs are cooled by conduction radially inwardly through the airfoil sidewalls with the heat being removed in the coolant channeled inside the airfoil. The airfoil may also include inclined tip holes disposed radially inwardly of the squealer ribs for forming a film cooling boundary of air typically along the pressure side of the airfoil for protecting the pressure side squealer rib portion.

Since the squealer ribs are disposed on both sides of the airfoil above the tip cap, they define therebetween an open tip cavity in which hot combustion gases may circulate to heat the inner sides of the squealer rib. The tip cap may include holes therethrough for discharging a portion of the coolant through the tip cavity, yet the squealer rib is still subject to heating on its three exposed sides.

Accordingly, it is desired to provide a turbine airfoil having improved tip cooling for increasing the useful life thereof or permitting operation with higher temperature combustion gases.

BRIEF SUMMARY OF THE INVENTION

A turbine airfoil includes a squealer rib extending outwardly from a tip cap to define a tip cavity thereatop. A thermal insulator is disposed in the tip cavity atop the tip cap.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
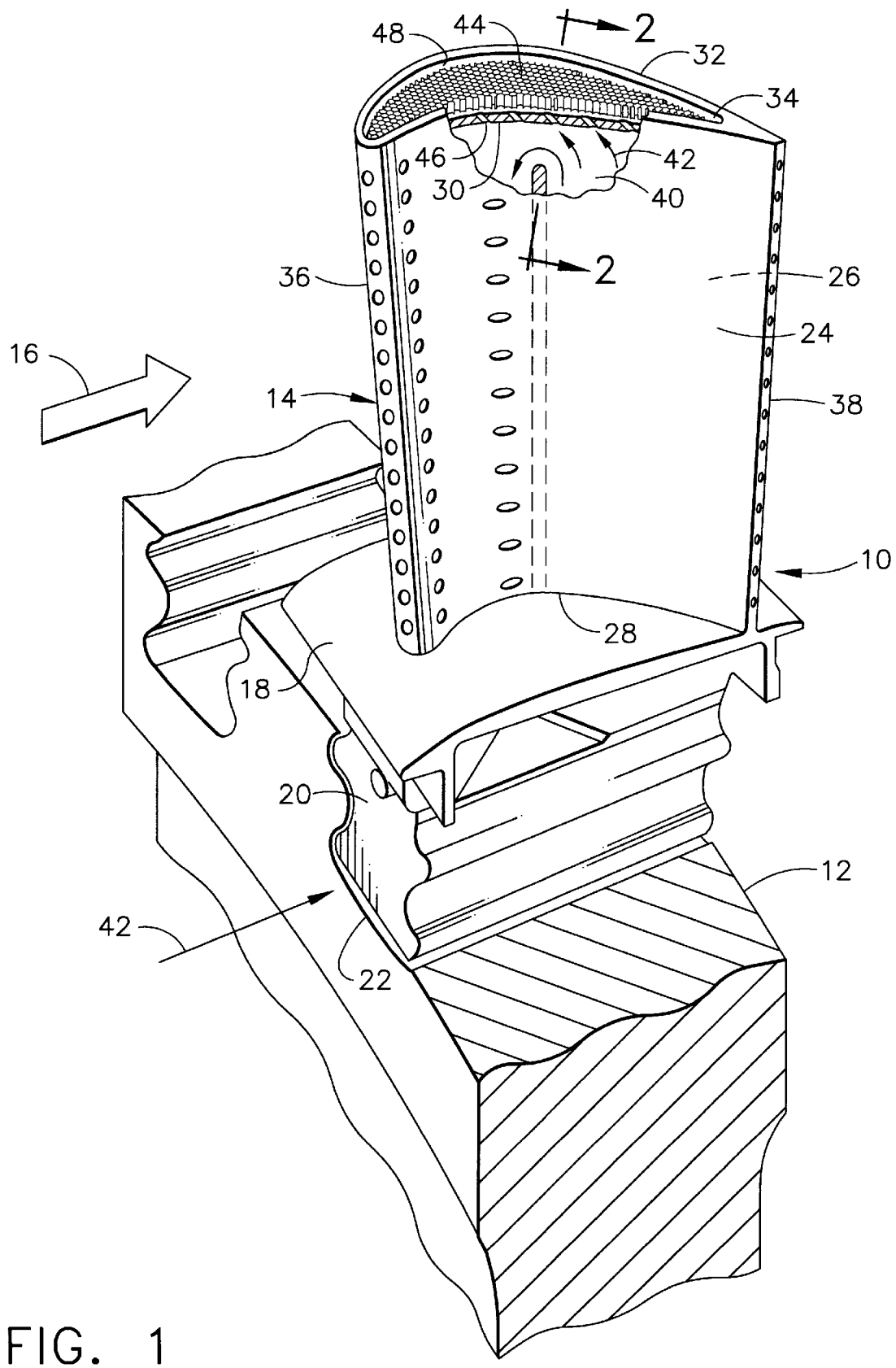
FIG. 1 is a partly sectional, isometric view of an exemplary turbine blade extending outwardly from a portion of a rotor disk in accordance with an exemplary embodiment of the present invention.

Illustrated in FIG. 1 is one of several gas turbine engine turbine rotor blades 10 mounted to the perimeter of a rotor disk 12, shown in part. The blade includes an airfoil 14 over which flows during operation hot combustion gases 16 generated by a combustor (not shown). The airfoil extends radially outwardly from the perimeter of the rotor disk and includes a platform 18 and a dovetail 20 typically formed in a unitary casting. The dovetail is conventional and is illustrated as an axial-entry dovetail which is retained in a complementary dovetail slot 22 formed in the perimeter of the disk.

The airfoil 14 includes a generally concave, first or pressure sidewall 24, and a circumferentially or laterally opposite second or suction sidewall 26 which is generally convex. The sidewalls extend longitudinally along the span of the airfoil from a root 28 at the juncture with the platform 18 to a radially outer tip cap or tip floor 30. A squealer tip or rib 32 extends radially outwardly from the tip cap 30 along both sidewalls 24,26 to define a radially outwardly open tip cavity 34 thereatop.

The two sidewalls extend axially or chordally between leading and trailing edges 36,38, and are spaced apart therebetween to define an internal cooling channel or circuit 40 laterally therebetween for channeling a coolant 42 such as pressurized air bled from a compressor (not shown) of the engine.

The cooling channel 40 may have any conventional configuration and extends through the platform and dovetail for receiving the bleed air coolant 42 channeled thereto in a conventional manner. The inside of the airfoil is cooled in any conventional manner including multi-pass serpentine circuits, with heat transfer enhancing turbulators therein and rows of film cooling holes extending through the sidewalls of the airfoil as required for cooling the airfoil and protecting the exposed sidewalls thereof.

The blade 10 including its airfoil 14 as above described is conventional in configuration, with the squealer rib 32 being formed as integral extensions of the pressure and suction sidewalls in a one-piece casting. As indicated above, the squealer rib 32 is subject to heating by the hot combustion gases 16 which flow over the airfoil sidewalls, as well as across the airfoil tip which is spaced radially inwardly from a surrounding turbine shroud (not shown).

In accordance with the present invention, the airfoil 14 of the turbine blade includes a thermal insulator 44 disposed in the tip cavity 34 atop the tip cap, and suitably bonded thereto, by brazing, for example. The insulator 44 occupies previously open space in the tip cavity for preventing recirculation of the hot combustion gases therein to thermally insulate the airfoil tip as well as provide improved cooling thereof.

As shown in FIG. 1, the cooling channel 40 is disposed inboard of the tip cap 30, and a plurality of tip holes 46 extend radially through the tip cap in flow communication with the cooling channel 40 for feeding the coolant into the tip cavity.

Figure 2:
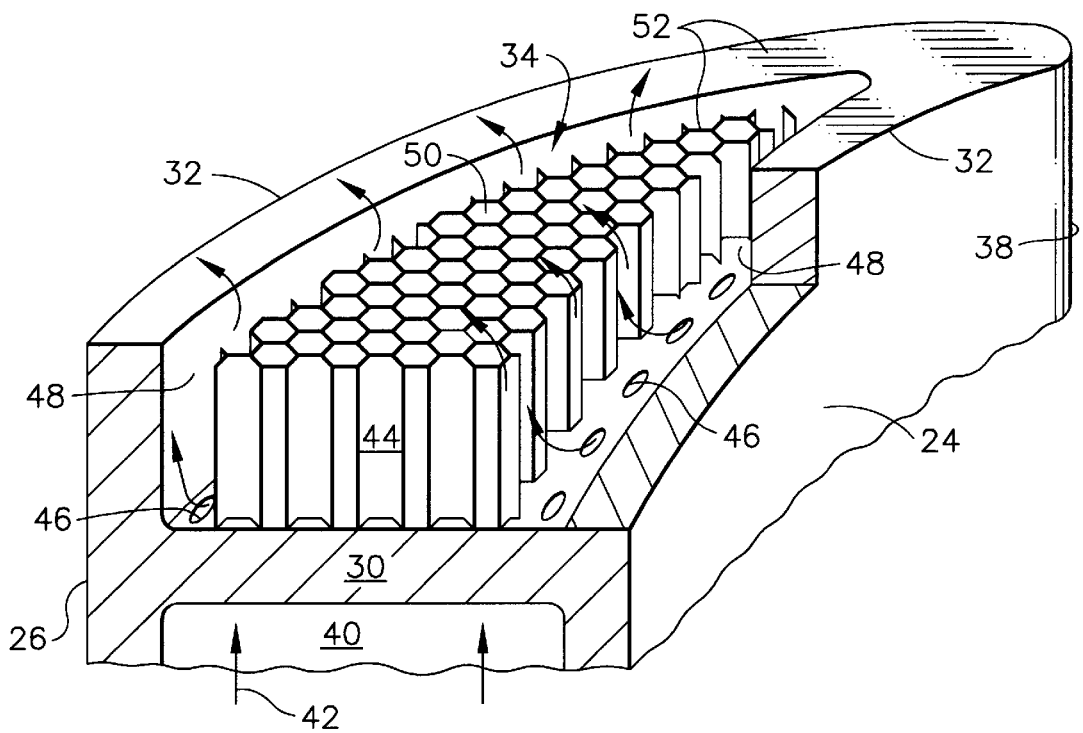
FIG. 2 is a partly sectional, isometric view of a portion of the blade tip illustrated in FIG. 1 and taken along line 2—2 showing a tip insulator in accordance with an exemplary embodiment of the present invention.

As shown in more detail in FIG. 2, the insulator 44 is preferably laterally spaced from the squealer rib 32 on at least one side of the airfoil to define a tip slot 48 therebetween.

In the preferred embodiment illustrated in FIG. 2, the tip slot 48 extends chordally along both sidewalls 24,26 and surrounds the insulator 44 around the full perimeter thereof and the full perimeter of the airfoil tip. In this way, the tip slot 48 has respective portions extending along both sidewalls and between the leading and trailing edges of the airfoil.

In a preferred embodiment, the tip holes 46 extend through the cap 30 and directly into the tip slot 48 for discharging the coolant therein. The tip holes 46 are preferably inclined through the tip cap at about 45 degrees to the span axis from trailing-to-leading edge to discharge the coolant into respective portions of the tip slot. In this way, the coolant fills the tip slot 48 and is ejected therefrom during operation into the tip gap defined with the opposing turbine shroud.

The thermal insulator 44 occupies a majority of the volume of the tip cavity and confines the coolant flow in the tip slot 48 for more effectively cooling the squealer rib 32 along its internal surface bounding the tip cavity. The coolant discharged from the tip slot 48 not only cools the inner surfaces of the squealer rib but prevent recirculation of the hot combustion gases therealong.

The tip slot 48 extends between the leading and trailing edges of the airfoil along at least one of the sidewalls, such as the pressure sidewall 24 which is typically subject to a high heat load during operation as compared with the suction sidewall 26. The tip slot 48 also preferably extends along the suction sidewall to ensure effective cooling of the squealer rib therealong. In the exemplary embodiment illustrated in FIG. 2, the tip slot 48 is open atop the squealer rib 32 for discharging the coolant radially outwardly therefrom around the full perimeter of the insulator.

The insulator 44 may have any suitable configuration and composition for providing thermal insulation atop the tip cap 30 and controlling coolant flow through the tip slot 48. In the preferred embodiment illustrated in FIGS. 1 and 2, the insulator 44 is a honeycomb with cells 50 of any suitable configuration such as hexagon, square, triangular, etc. A honeycomb insulator is lightweight yet occupies most of the volume of the tip cavity to reduce or prevent recirculation of the hot combustion gases therein. The gas or air within the honeycomb cells may remain stagnant during operation for providing thermal insulation.

As shown in FIG. 2, the insulator 44 is preferably shorter than the squealer rib 32, and is recessed slightly in height below the radially outermost end thereof to protect the insulator as the squealer rib 32 initially rubs during break-in operation. The cells 50 extend longitudinally or radially outboard from the tip cap 30 generally perpendicular thereto. The cells 50 are preferably empty for reducing weight and providing thermal insulation, and may be brazed at their inboard ends to the tip cap 30.

In this way, the vertical cells prevent any cross flow of fluid from cell to cell, and may be cooled by conduction through the tip cap 30 and cooled from below by the coolant 42. The coolant discharged from the tip slots 48 provides additional cooling of the insulator itself during operation.

The thermal mass of the honeycomb insulator 44 may be minimized by using thin wall cells having a high density of cells per unit area formed of a suitable metal for withstanding the hostile environment of the gas turbine. An exemplary material is Haynes 214 (trademark) which is oxidation resistant and commonly used in gas turbine engines. An aluminide coating may also be added for added oxidation resistance if desired.

As shown in FIG. 2, the cells 50 are empty and open at their radially outer ends for minimizing weight yet providing fluid stagnation therein for effecting thermal insulation. The insulator 44 preferably fills the entire tip cavity 34, except along the surrounding tip slot 48 extending along both sidewalls from leading to trailing edges.

If desired, the cells 50 may include a thermal barrier coating (TBC) 52 at the outboard ends thereof for providing enhanced thermal insulation. Thermal barrier coatings are conventional and typically include a ceramic applied by plasma spray deposition.

Figure 3:
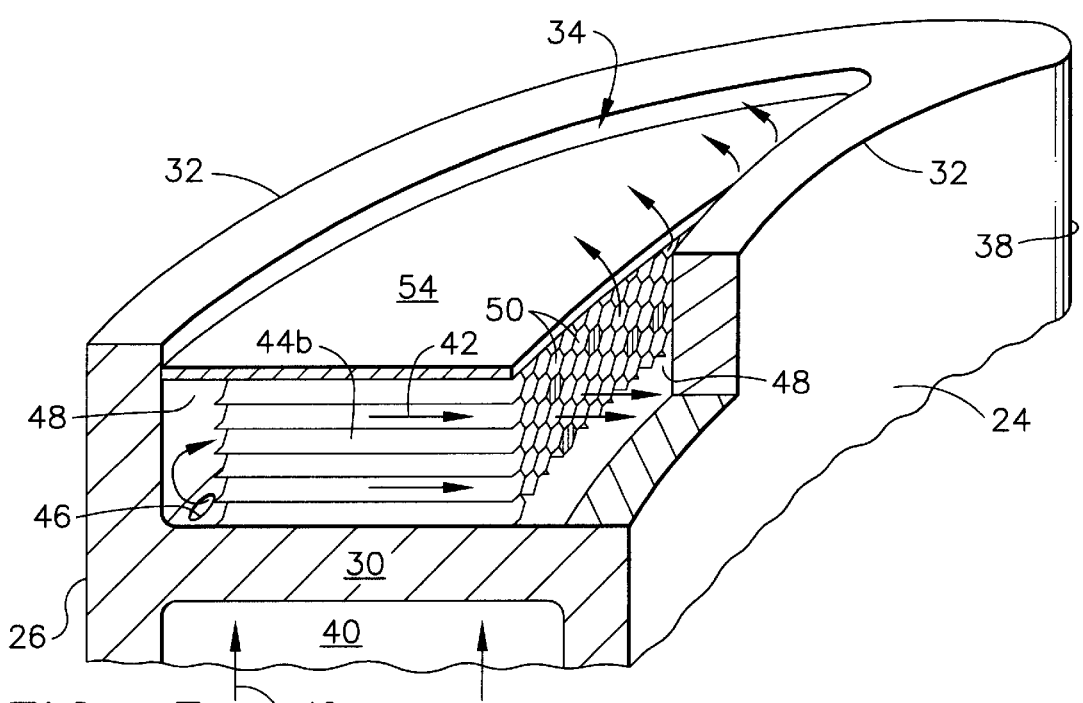
FIG. 3 is a partly sectional, isometric view, like FIG. 2, of the blade tip in accordance with an alternate embodiment of the present invention.

FIG. 3 illustrates an alternate embodiment of the present invention wherein the thermal insulator is in the form of a honeycomb, designated 44b, having cells 50 extending parallel with the tip cap 30, or laterally between the pressure and suction sidewalls 24,26. The honeycomb insulator 44b is again preferably spaced from the squealer rib 32 along both sidewalls 24,26 so that the tip slot 48 surrounds the entire insulator along its perimeter.

The honeycomb cells 50 may have any suitable configuration as described above, with most of the cells being empty and open at both of their opposite ends for channeling coolant therethrough from the tip holes 46 between respective portions of the tip slot 48 on opposite sidewalls.

As shown in FIG. 3, the insulator 44b is spaced laterally from the inner surfaces of the squealer rib 32 on opposite sidewalls of the airfoil to define corresponding pressure-side and suction-side tip slots. A baffle or cover 54 is disposed atop the insulator, and preferably extends to the suction-side squealer rib and is sealingly joined thereto, by brazing for example. The baffle is spaced from the pressure-side squealer rib to leave open the tip slot therealong.

The baffle 54 thusly closes the top of the suction-side tip slot at the top of the corresponding squealer rib. The tip holes 46 are preferably provided only in the suction-side tip slot and not in the pressure-side tip slot. The baffle 54 closes the tip slot outboard of the tip holes 46 to confine the coolant 42 to flow through the honeycomb cells 50 to feed the pressure-side tip slot.

As also shown in FIG. 3, some of the cells 50 may be plugged with a suitable material, such as wire inserts, to prevent coolant flow therethrough for increasing the velocity of the coolant through the empty cells. In this way, the velocity of the impingement jets from the empty cells may be increased for enhancing impingement cooling. And, the cells may be selectively plugged to tailor the cooling requirements along the length of the squealer rib 32 as desired.

In this way, the coolant 42 flows laterally through the honeycomb cells 50 for cooling the honeycomb itself and enhancing thermal insulation thereof. The coolant 42 is then discharged from the outlet ends of the cells perpendicular to the inner surface of the squealer rib 32 along the pressure sidewall 24 for providing impingement cooling of the squealer rib. The pressure-side squealer rib is thusly more effectively cooled by impingement cooling. The suction-side squealer rib is simply cooled by convection from the coolant discharged from the tip holes 46. Since the airfoil pressure side typically experiences a greater heat load than the suction side, impingement cooling of the pressure-side squealer rib provides maximum cooling effect corresponding with the higher thermal load therealong.

The various forms of the thermal insulator disclosed above provide effective thermal insulation for the airfoil tip by filling the tip cavity in most part, or in full, with thermal insulating material. Recirculation of hot combustion gases is therefore prevented in the tip cavity for reducing heat input therein. The coolant discharged through the tip holes 46 provides effective convection and film cooling of the inner surfaces of the squealer rib. In the embodiment illustrated in FIG. 3, the coolant provides enhanced cooling using impingement jets of the coolant against the inner surface of the pressure-side squealer rib. And, the open tip slots discharge the coolant in a film over the outer surface of the insulator itself providing film cooling protection thereof during operation.

The thermal insulator is preferably a honeycomb structure for reduced weight and reduced thermal mass, but may have other configurations. For example, the insulator may be a porous metallic wool, or may be formed of ceramic materials.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A turbine airfoil comprising a squealer rib extending outwardly from a tip cap to define a tip cavity thereatop and a thermal insulator disposed in said tip cavity atop said tip cap.

2. An airfoil according to claim 1 further comprising an internal cooling channel disposed inboard of said cap for channeling a coolant, and a plurality of tip holes extending through said cap in flow communication with said cooling channel for feeding said coolant into said tip cavity.

3. An airfoil according to claim 2 wherein said insulator is spaced from said squealer rib to define a slot, and said tip holes extend through said cap into said slot for discharging said coolant therein.

4. An airfoil according to claim 3 further comprising first and second sidewalls extending longitudinally with said squealer rib formed integrally therewith, and extending chordally between leading and trailing edges, with said sidewalls being spaced apart to define said cooling channel therebetween, and said slot extends between said leading and trailing edges along at least one of said sidewalls.

5. An airfoil according to claim 4 wherein said slot extends along both said sidewalls surrounding said insulator.

6. An airfoil according to claim 4 wherein said slot is open atop said squealer rib.

7. An airfoil according to claim 4 wherein said slot is closed atop said squealer rib.

8. An airfoil according to claim 4 wherein said insulator is a honeycomb.

9. An airfoil according to claim 8 wherein said insulator is shorter than said squealer rib.

10. An airfoil according to claim 8 wherein said insulator includes cells extending longitudinally outboard from said cap.

11. An airfoil according to claim 10 wherein said cells are open.

12. An airfoil according to claim 10 wherein said insulator fills said tip cavity and is surrounded by said slot along both said sidewalls.

13. An airfoil according to claim 10 wherein said cells include a thermal barrier coating at outboard ends thereof.

14. An airfoil according to claim 8 wherein said insulator includes cells extending parallel with said cap.

15. An airfoil according to claim 14 wherein:

said insulator is spaced from said squealer rib along both of said sidewalls, and said slot surrounds said insulator;

said tip holes are disposed in said slot along one of said sidewalls; and said cells are empty for channeling coolant therethrough between respective portions of said tip slot on opposite sidewalls.

16. An airfoil according to claim 15 further comprising a baffle disposed atop said insulator sealingly joined to said squealer rib to close said tip slot outboard of said tip holes.

17. An airfoil according to claim 16 wherein said insulator further includes cells adjoining said empty cells.

18. A turbine airfoil 14 comprising:

first and second sidewalls extending longitudinally from a root to a tip cap, and chordally between leading and trailing edges, and spaced apart therebetween to define an internal cooling channel for channeling a coolant;

a squealer rib extending outwardly from said tip cap along both said sidewalls to define a tip cavity thereatop; and a thermal insulator disposed in said tip cavity atop said cap.

19. An airfoil according to claim 18 wherein:

said insulator is spaced from said squealer rib along said sidewalls to define a slot surrounding said insulator; and said tip cap includes tip holes extending therethrough in flow communication with said slot for discharging said coolant therein.

20. An airfoil according to claim 19 wherein said insulator is a honeycomb.

21. An airfoil according to claim 20 wherein said insulator includes cells extending longitudinally outwardly from said cap.

22. An airfoil according to claim 20 wherein said insulator includes cells extending parallel with said cap.

23. An airfoil according to claim 22 further comprising a baffle disposed atop said insulator sealingly joined to said squealer rib to close said tip slot in part outboard of said tip holes.

* * * * *